(12) United States Patent
Huang et al.

(10) Patent No.: US 7,821,885 B2
(45) Date of Patent: *Oct. 26, 2010

(54) TE SIGNAL POLARITY DETERMINING SYSTEM AND RELATED METHOD THEREOF

(75) Inventors: Chao-Ming Huang, Hsin-Chu (TW); Shih-Jung Chiu, Tainan County (TW)

(73) Assignee: Mediatek Inc., Hsin-Chu (TW)

( * ) Notice: Subject to any disclaimer, the term of this patent is extended or adjusted under 35 U.S.C. 154(b) by 456 days.

This patent is subject to a terminal disclaimer.

(21) Appl. No.: 11/927,691

(22) Filed: Oct. 30, 2007

(65) Prior Publication Data
US 2009/0109807 A1   Apr. 30, 2009

(51) Int. Cl.
*G11B 7/00* (2006.01)
(52) U.S. Cl. ............. 369/44.29; 369/44.28; 369/44.34; 369/44.35; 369/44.13
(58) Field of Classification Search ............ None
See application file for complete search history.

(56) References Cited

U.S. PATENT DOCUMENTS 5,508,995 A * 4/1996 Moriya et al. ............ 369/275.4
2006/0203631 A1   9/2006 Wu

FOREIGN PATENT DOCUMENTS

| CN | 1832008 | 9/2006 |
|---|---|---|
| JP | 2002-269772 | 9/2002 |
| JP | 2004-134007 | 4/2004 |

* cited by examiner

*Primary Examiner*—Muhammad N. Edun
(74) *Attorney, Agent, or Firm*—Winston Hsu; Scott Margo; Min-Lee Teng

(57) ABSTRACT

Disclosed is a TE signal polarity determining method, which includes: (a) obtaining a detection signal from an optical disc; (b) obtaining characteristics of the detection signal corresponding to different polarities of the TE signal; and (c) determining whether an original polarity of the TE signal should be changed or not according to the obtained characteristics.

15 Claims, 15 Drawing Sheets

TE SIGNAL POLARITY DETERMINING SYSTEM AND RELATED METHOD THEREOF

BACKGROUND OF THE INVENTION

Conventionally, high capacity optical discs can be classified into L to H (Low to High) optical disc types and H to L (High to Low) optical disc types. The L to H optical disc type is always an in-groove disk, and the H to L optical disc type is always an on-groove disk. These two kinds of optical discs not only have different reflection rates of light from an optical pickup head after recording, but also have different polarities for a TE (tracking error) signal. Therefore, if an optical disc needs to be read, the type of disc (in-groove or on-groove) must be determined first, such that a correct track can be locked and the data can be read.

However, related art methods always require a tracking on process for reading an optical disc. That is, locking a track first and determining if the track is correct via reading some information recorded on the optical disc. However, servo calibration is needed for reading the information recorded on the optical disc. Therefore, if the tracking on process is wrong, the servo calibration should be repeated and the time for servo on will thereby be delayed, so the performance of the optical disc driver decreases.

SUMMARY OF THE INVENTION

Therefore, one objective of the present invention is to provide a TE signal determining system and related method thereof. By acquiring the polarity of the TE signal, the type of optical disc can be obtained.

One embodiment of the present invention discloses a TE signal polarity determining method, comprising: (a) obtaining a wobble related signal, an RF related signal and a TE signal from an optical disc; and (b) determining if an original polarity of a TE signal should be changed or not according to phases of the RF related signal, and the wobble related signal.

A TE signal polarity determining system corresponding to this method is also disclosed, which comprises: a detection signal generator, for obtaining a wobble related signal and an RF related signal; and a determining circuit, coupled to the detection signal generator, for determining if an original polarity of the TE signal should be changed or not according to phases of the RF related signal and the wobble related signal.

Another embodiment of the present invention discloses a TE signal polarity determining method, which comprises: (a) obtaining a wobble related signal and a TE signal from an optical disc accessed by an accessing head; (b) moving the accessing OPU lens. and (c) determining if an original polarity of the TE signal from the optical disc should be changed or not according to the relation between the wobble related signal and the moving direction of the accessing OPU lens.

A TE signal polarity determining system corresponding to this method is also disclosed, which comprises: a detection signal generator, for obtaining a wobble related signal and a TE signal from an optical disc; an accessing head, for accessing the optical disc; and a determining circuit, for determining if an original polarity of the TE signal from the optical disc should be changed or not according to the relation between the wobble related signal and a moving direction of the OPU lens.

Utilizing the above-mentioned system and method, the polarity of the TE signal and the optical disc type can be confirmed before tracking on, such that a correct track can be tracked on and correct data can be read quickly, thereby raising the performance of the optical disc drive.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 (b) is a schematic diagram illustrating the operation of the wobble dir signal when the OPU lens moves for an in-groove optical disc.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
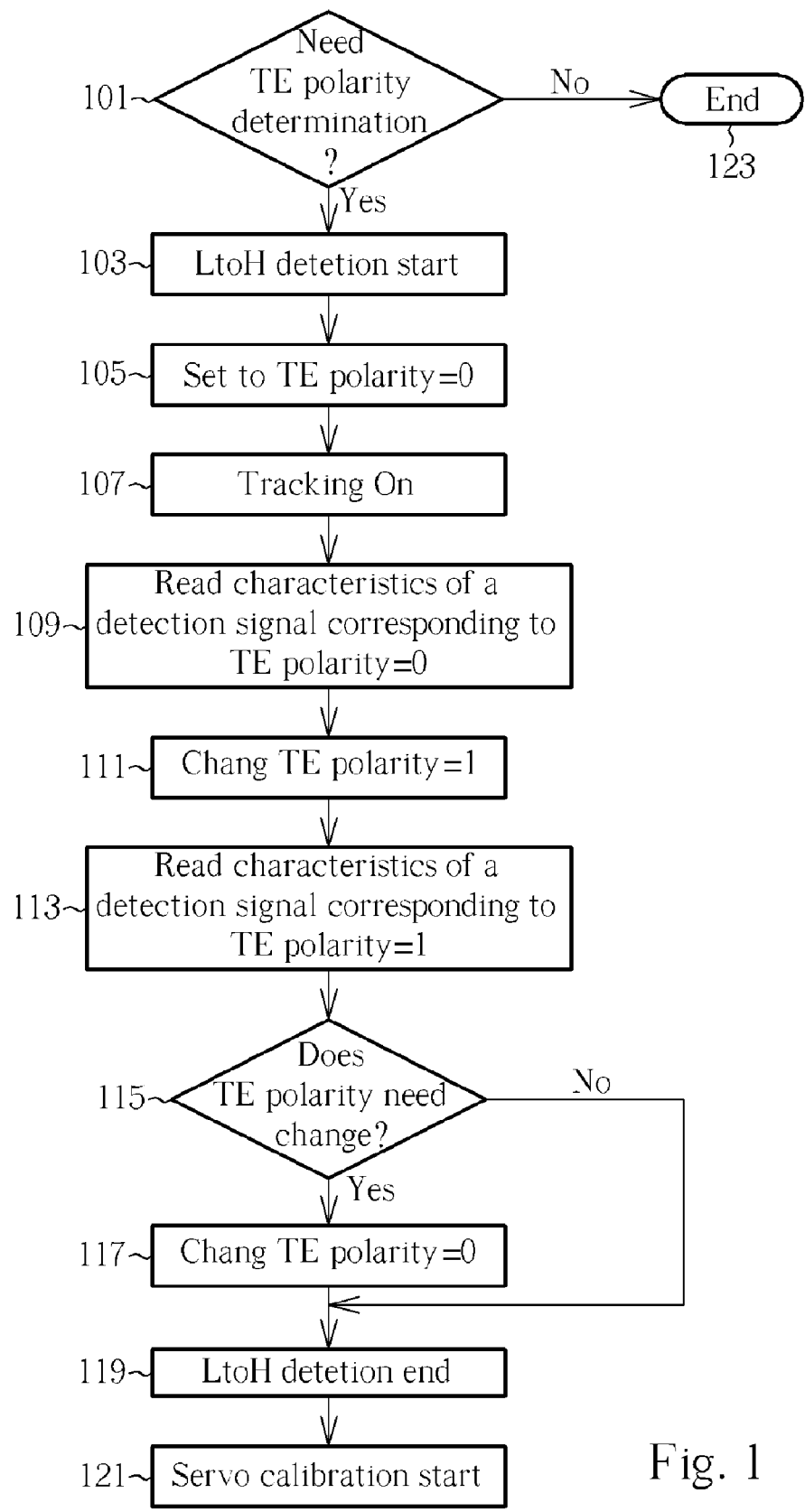
FIG. 1 is a flow chart illustrating the steps of a TE signal polarity determining method according to a first embodiment of the present invention.

FIG. 1 is a flow chart illustrating the steps of a TE signal polarity determining method according to a first embodiment of the present invention. As shown in FIG. 1, the TE signal polarity determining method comprises:

Step 101: Determine if the TE polarity determination of the optical disc is required. If yes, go to step 103, if not, end the process.

For example, if the optical disc is a BD (Blue-Ray) disc, it needs TE polarity determination, whereas if the optical disc is an optical disc of a different type, the TE polarity determination may be unnecessary.

Step 103: Start L to H detection.
Step 105: Set TE polarity=0
Step 107: Tracking on.
Step 109: Read characteristics of a detection signal corresponding to TE polarity=0.

The detection signal is generated from the signals reflected from the optical disc, and can be a wobble signal, a wobble related signal or an RF related signal, but this is not meant to limit the scope of the present invention.

Step 111: Change TE polarity to 1.
Step 113: Read characteristics of a detection signal corresponding to TE polarity=1.
Step 115: Determine if the TE polarity needs to be changed or not. If yes, go to step 117, if not, go to step 119.
Step 117: Change TE polarity=0
Step 119: L to H detection end
Step 121: Servo calibration start.
Step 123: End If the detection signal is a wobble signal, Step 115 determines if the original polarity of the TE signal should be changed or not according to the ripple of the wobble signal. In this case, since the wobble signal has different phases for 180° in 2.5 circles for an optical disc, the observing operation should be performed for at last 2.5 circles. Also, if the detection signal is a wobble related signal such as a wobble AGC (auto gain control) signal, Step 115 determines if the original polarity of the TE signal should be changed or not according to the amplitude of the wobble AGC signal. If the detection signal is an RF related signal such as an RF AGC signal, Step 115 determines if the original polarity of the TE signal should be changed or not according to the amplitude of the RF AGC signal.

It should be noted that, although the wobble AGC signal and RF AGC signal are taken as examples of the wobble related signal and RF related signal, this is not meant to limit the scope of the present invention. Other wobble related or RF related signals can also be utilized according to the disclosure.

Figure 2:
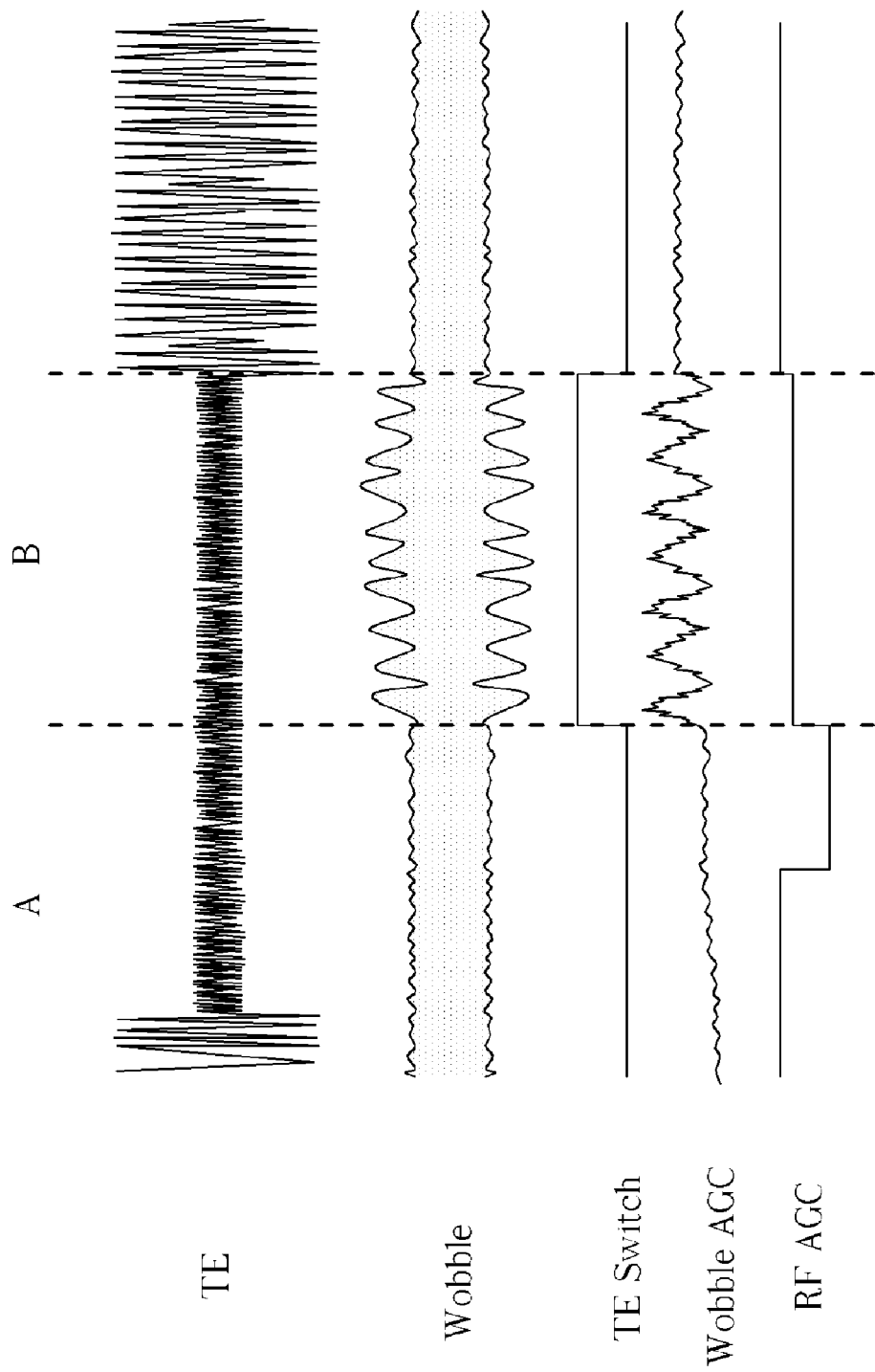
FIG. 2 is a schematic diagram illustrating signals of an on-groove disk.
Figure 3:
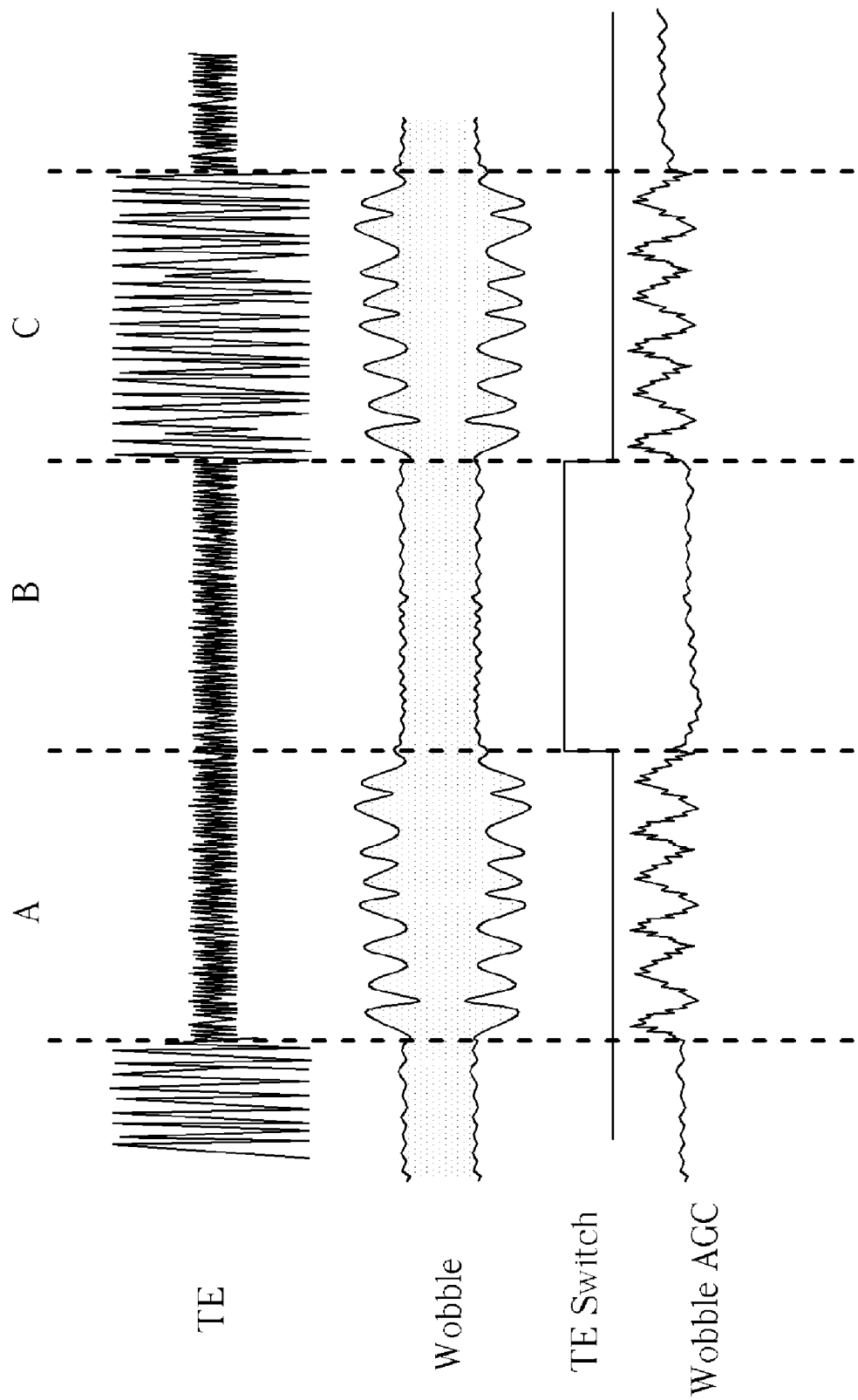
FIG. 3 is a schematic diagram illustrating signals of an in-groove disk.

FIG. 2 and FIG. 3 are schematic diagrams illustrating the relations of signals utilized in the embodiment shown in FIG. 1, wherein FIG. 2 indicates an on-groove optical disk. As shown in FIG. 2, the TE signal has different polarities in region A and region B. In this case, the TE signal has correct polarity for the track in region A and incorrect polarity in region B. The TE switch signal is utilized for changing the TE polarity. As shown in FIG. 2, the wobble signal has a larger ripple in region B than in region A, that is, the wobble signal has a larger ripple in the region with incorrect TE polarity than the region with correct TE polarity. Therefore, the TE polarity can be easily determined to be correct or incorrect by observing the ripple of the wobble signal.

FIG. 3 illustrates the situation of an in-groove disc, which is similar to the situation described in FIG. 2. As shown in FIG. 3, the TE signal has opposite polarities in regions A, B, and C respectively. That is, the TE signal has correct polarity for a track in region B, but has incorrect polarity for a track in regions A and C, therefore the ripple of the wobble signal in regions A and C is larger than the ripple of the wobble signal in region B. Thus the TE polarity can be determined utilizing the above-mentioned rule.

As described above, the wobble AGC signal can also be used for determining the TE polarity. As shown in FIG. 2 and FIG. 3, the amplitudes of the wobble AGC signal in the region(s) with incorrect polarity are larger than the region(s) with correct polarity. This is because the wobble AGC signal will become larger in the region with incorrect TE polarity to increase the wobble signal. Therefore the TE polarity can be easily determined by observing the amplitude of the wobble AGC signal. As described above, other wobble related signals can also be used for determining TE polarity, for example, a wobble frequency signal, wobble error rate signal, or wobble PLL control signal.

Furthermore, an RF related signal can also be used for determining the TE polarity. As known by persons skilled in the art, an RF signal will be smaller in a region with incorrect TE polarity, thus the voltage level of the RF AGC signal will rise in the region with incorrect TE polarity in order to increase the RF signal. Accordingly, the TE polarity can be easily determined via observing the RF AGC signal. Other RF related signals can also be utilized to reach the same function. If the original TE signal polarity is set to a specific optical disc type, than the optical disc type can be obtained via the TE signal polarity determining method according to the embodiments of the present invention.

Figure 4:
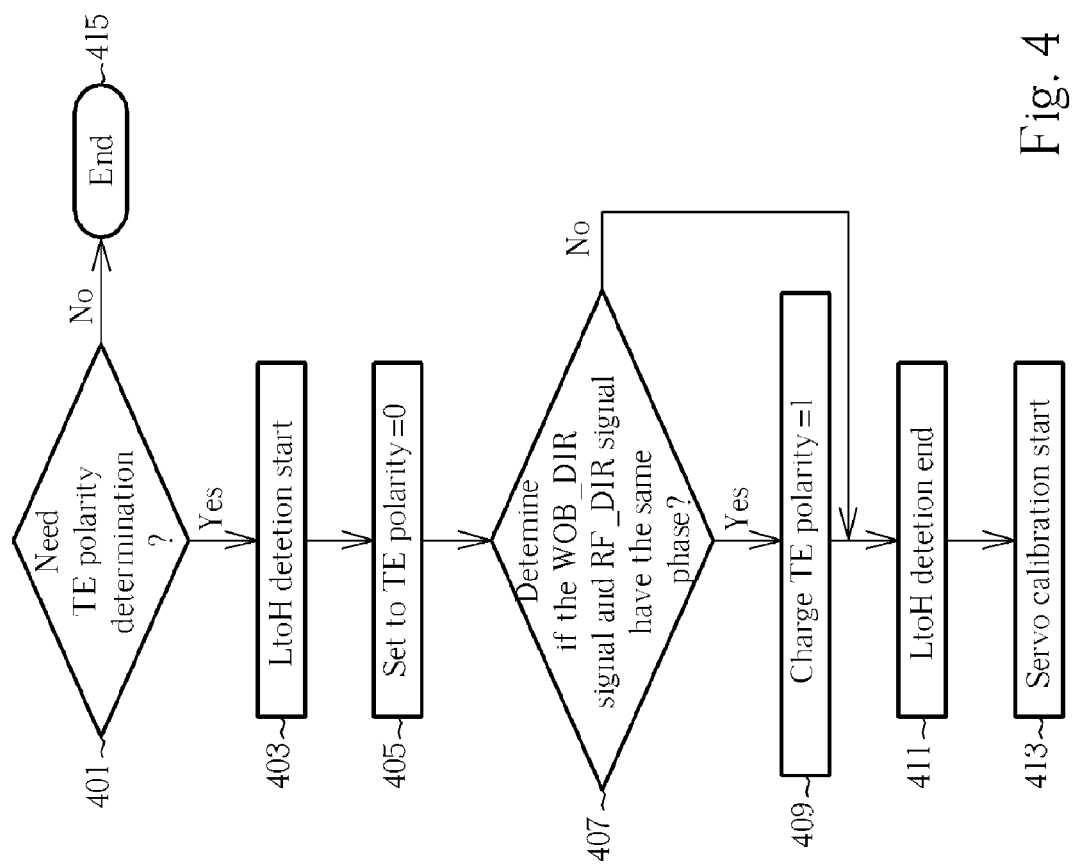
FIG. 4 is a flow chart illustrating the steps of a TE signal polarity determining method according to a second embodiment of the present invention.

FIG. 4 is a flow chart illustrating the steps of the TE signal polarity determining method according to a second embodiment of the present invention. As shown in FIG. 4, the method comprises:

Step 401: Determine if the optical disc requires TE polarity determination. If yes, go to step 403, if not, end the process.
Step 403: Start L to H detection.
Step 405: Set TE polarity=0
Step 407: Determine if the wobble dir signal WOB_DIR and the RF dir signal RF_DIR have the same phase. If yes, go to step 409, if not, go to step 411.

In this case, the wobble dir signal is generated from a wobble related signal such as a wobble envelope signal, and the RF dir signal is generated from an RF related signal such as an RF sum signal. The detailed description is illustrated by means of FIG. 5~FIG. 9.

Step 409: Change TE polarity to 1.
Step 411: L to H detection ends.
Step 413: Servo calibration start.
Step 415
End Since the wobble dir signal is derived from a wobble related signal and the RF dir signal is derived from an RF related signal, the embodiment shown in FIG. 4 can be summarized as follows: a wobble related signal and an RF related signal are obtained; and it is determined if an original polarity of the TE signal should be changed or not according to phases of the RF related signal and the wobble related signal.

Figure 5:
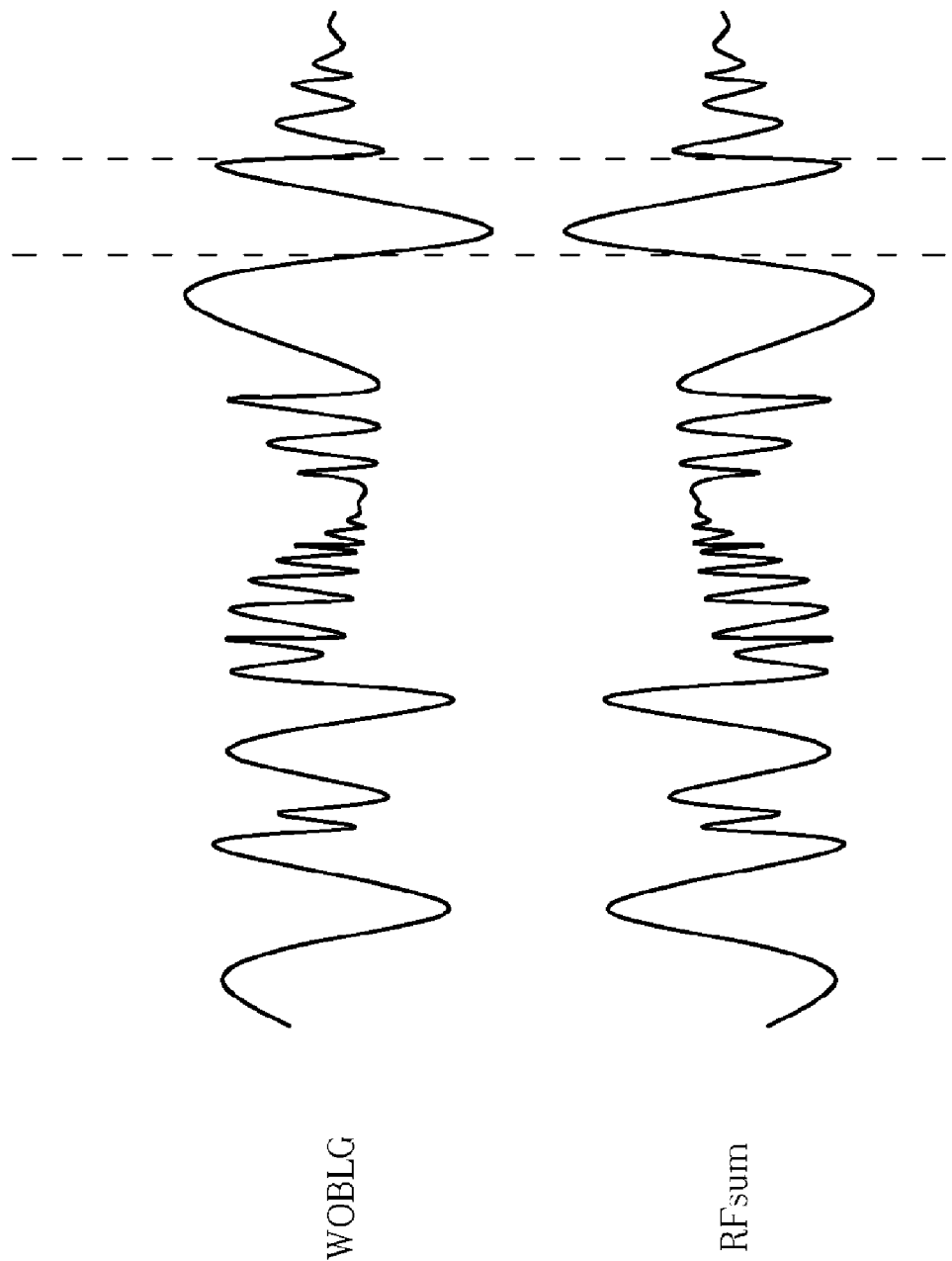
FIG. 5 and FIG. 6 are schematic diagrams illustrating the relations between signals utilized in the embodiment shown in FIG. 4.
Figure 6:
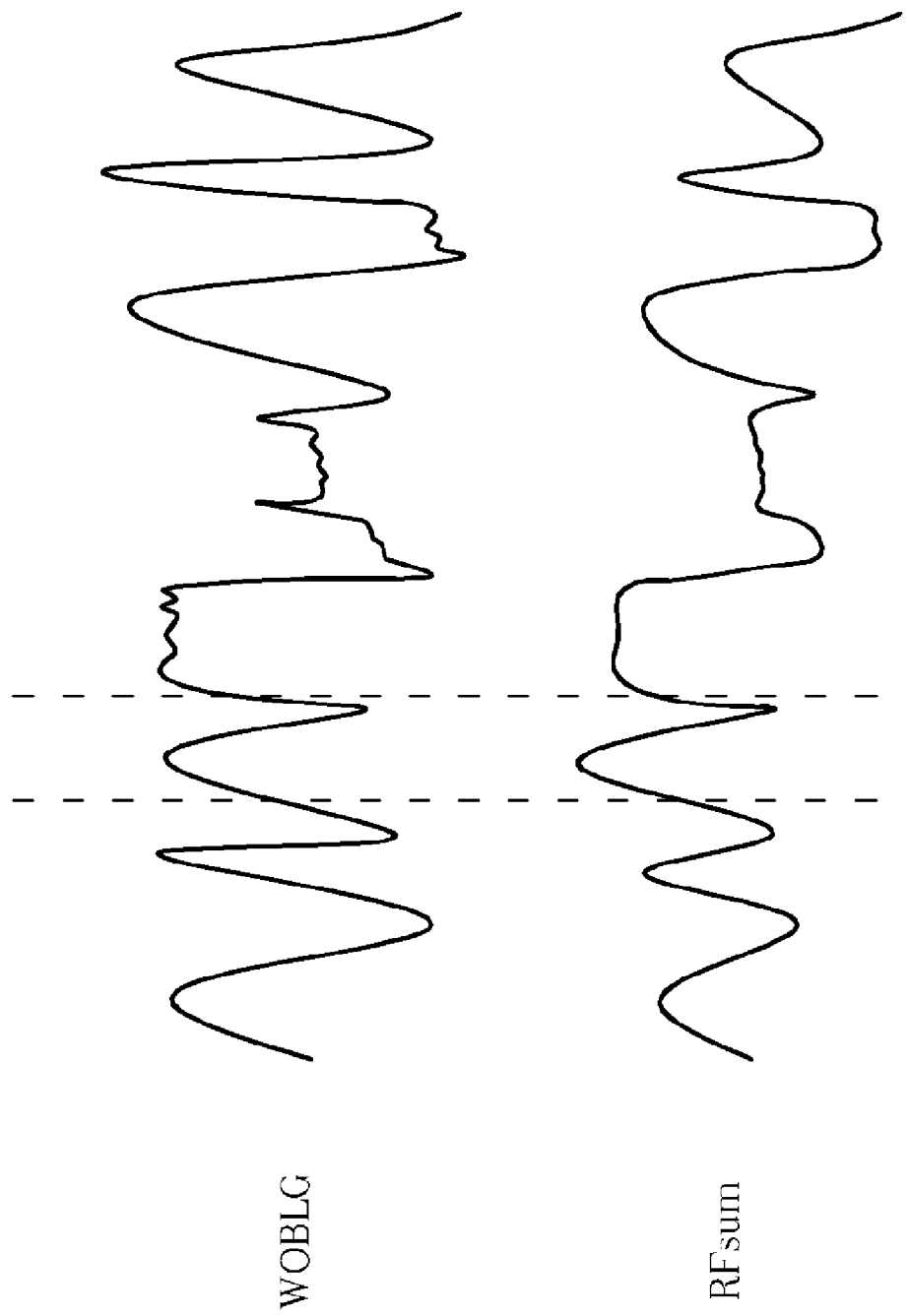

FIG. 5 to FIG. 9 are schematic diagrams illustrating the relations of signals utilized in the embodiment shown in FIG. 4 and how the signal is generated. As shown in FIG. 5, for an on groove optical disc, a wobble envelope signal WOBLG has anti-phase with an RF sum signal $RFs_{um}$. For an in groove optical disc, a wobble envelope signal WOBLG is in-phase with an RF sum signal, as shown in FIG. 6. Therefore the TE polarity can be easily determined by observing the wobble envelope signal WOBLG and the RF sum signal.

Figure 7:
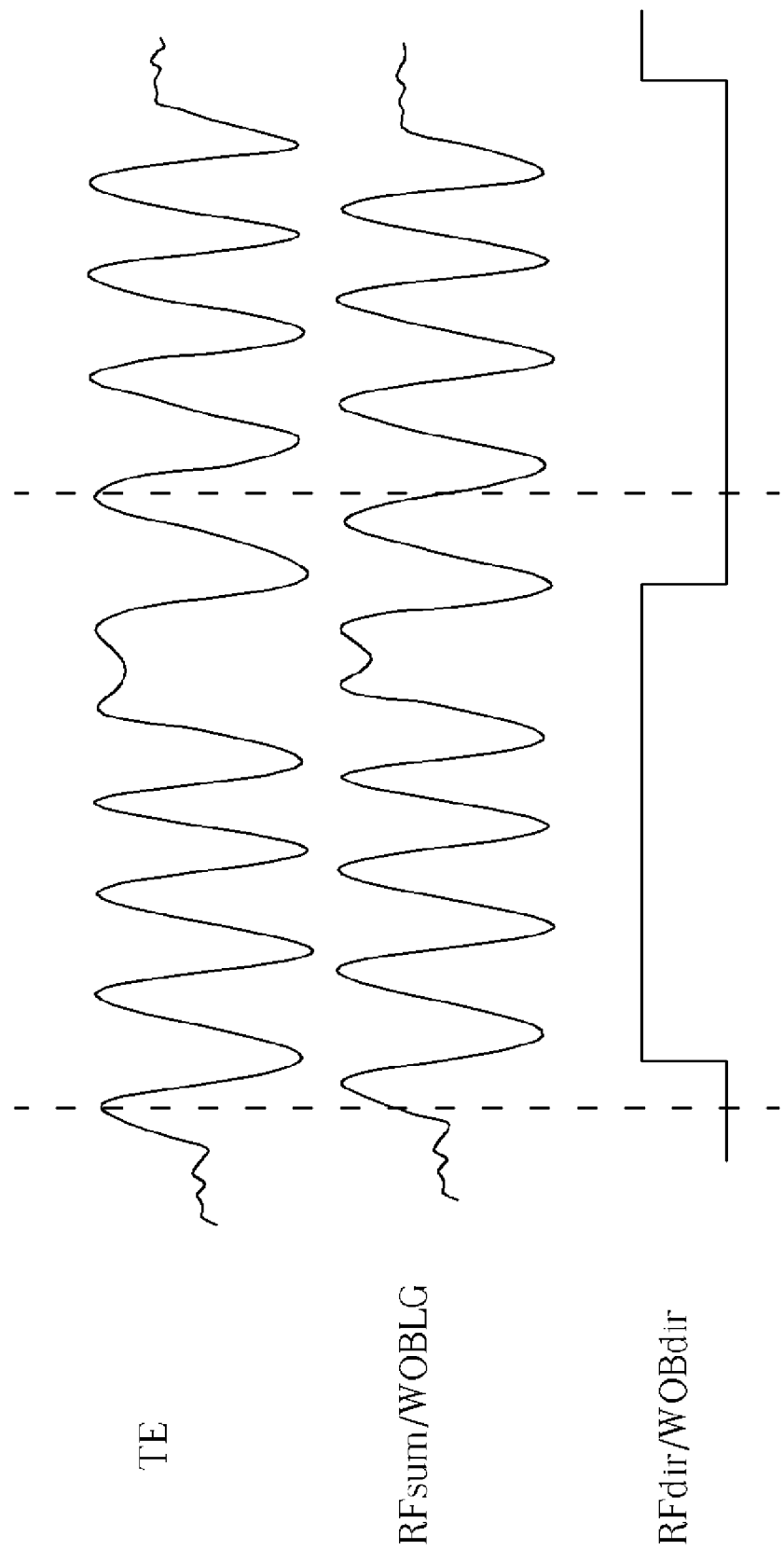
FIG. 7 is a schematic diagram illustrating how a wobble dir signal and RF dir signal are generated.

For convenience of determination, the wobble envelope signal WOBLG and the RF sum signal $RFs_{um}$ can be compared with the TE signal to generate signals that can also be used for determining the TE polarity, as shown in FIG. 7. If the phase of the wobble envelope signal WOBLG leads the phase of the TE signal, the voltage level of the wobble dir signal is high, and if the phase of the wobble envelope signal WOBLG lags the phase of the TE signal, the voltage level of the wobble dir signal is low. Similarly, if the phase of the RF sum signal Rf$_{sum}$ leads the phase of the TE signal, the voltage level of the RF dir signal is high, and if the phase of the RF sum signal RF$_{sum}$ lags the phase of the TE signal, the voltage level of the RF dir signal is low. It should be noted that the wobble related signal is not limited to a wobble dir signal and the RF related signal is not limited to an RF dir signal; other wobble related and RF related signals can also be utilized.

Figure 8:
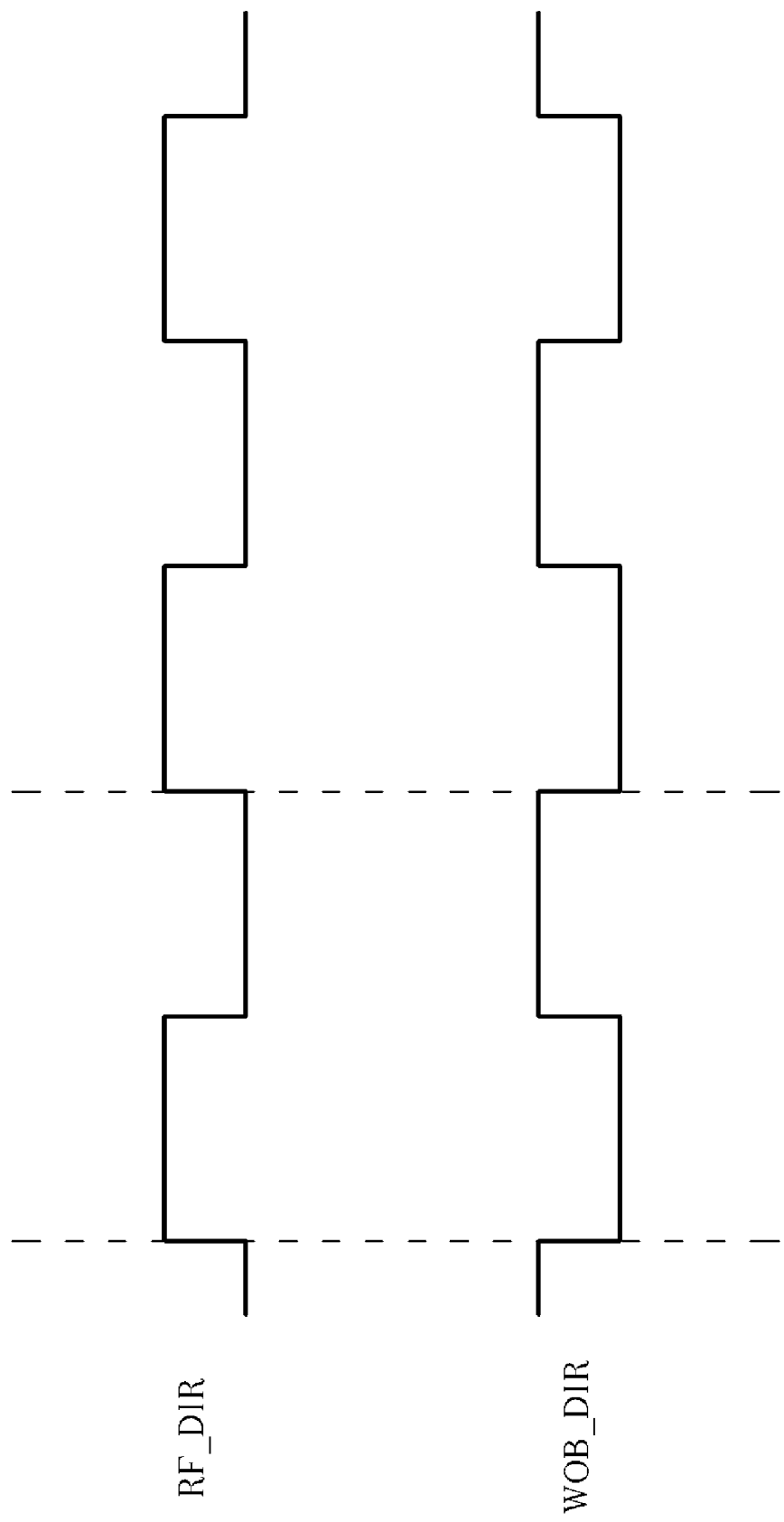
FIG. 8 and FIG. 9 are diagrams illustrating the operation of utilizing the RF dir signal and the wobble dir signal to determine TE signal polarity.
Figure 9:
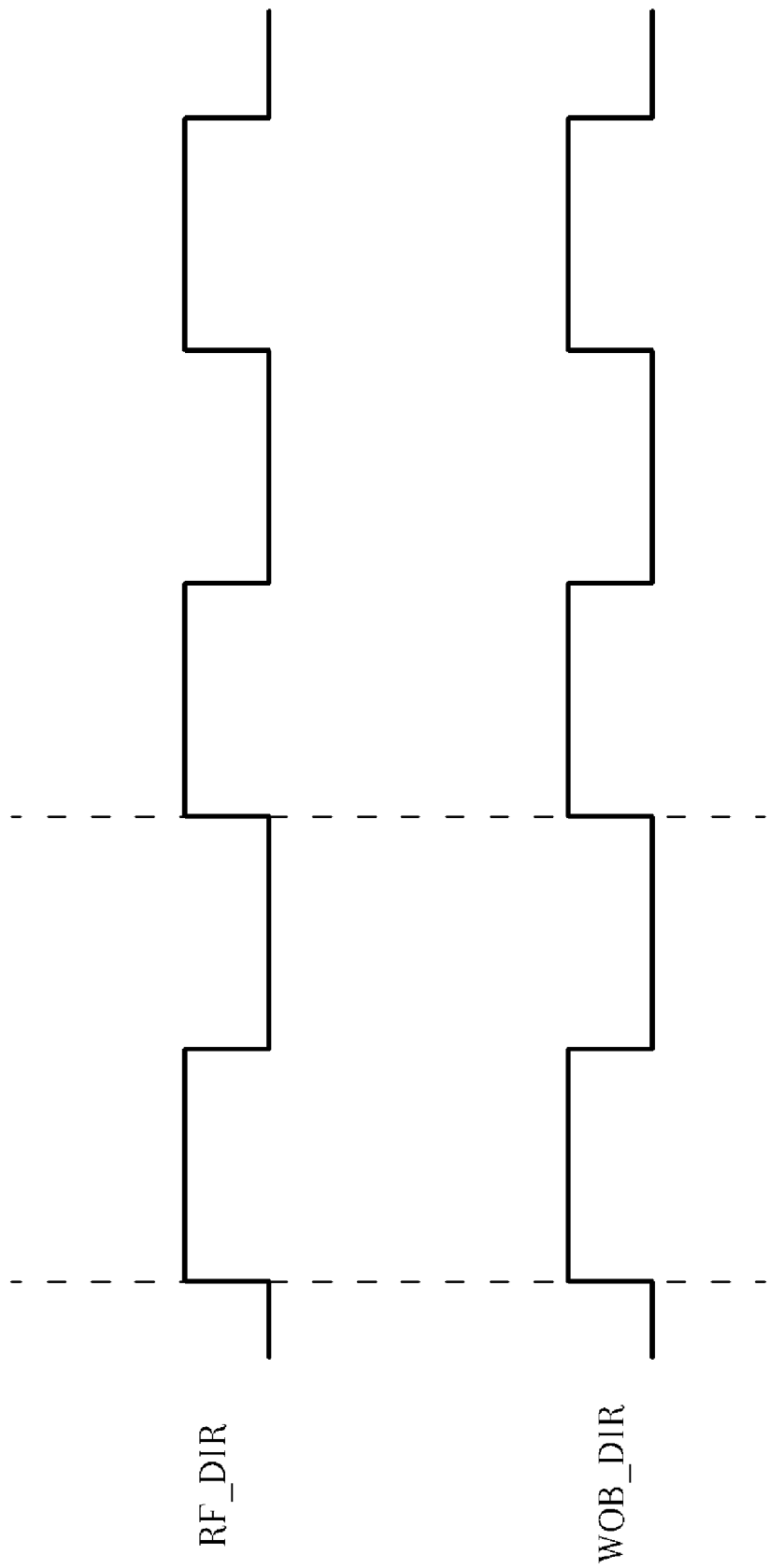

FIG. 8 and FIG. 9 illustrate the operation for utilizing the RF dir signal and the wobble dir signal to determine TE signal polarity. As shown in FIG. 8, for an on groove disc, the wobble dir signal WOB_DIR is anti-phase with an RF dir signal RF_DIR. For an in groove optical disc, a wobble dir signal WOB_DIR is in-phase with an RF dir signal RF_DIR, as shown in FIG. 9. Therefore the TE polarity can be easily determined via observing the wobble dir signal and the RF dir signal.

Figure 10:
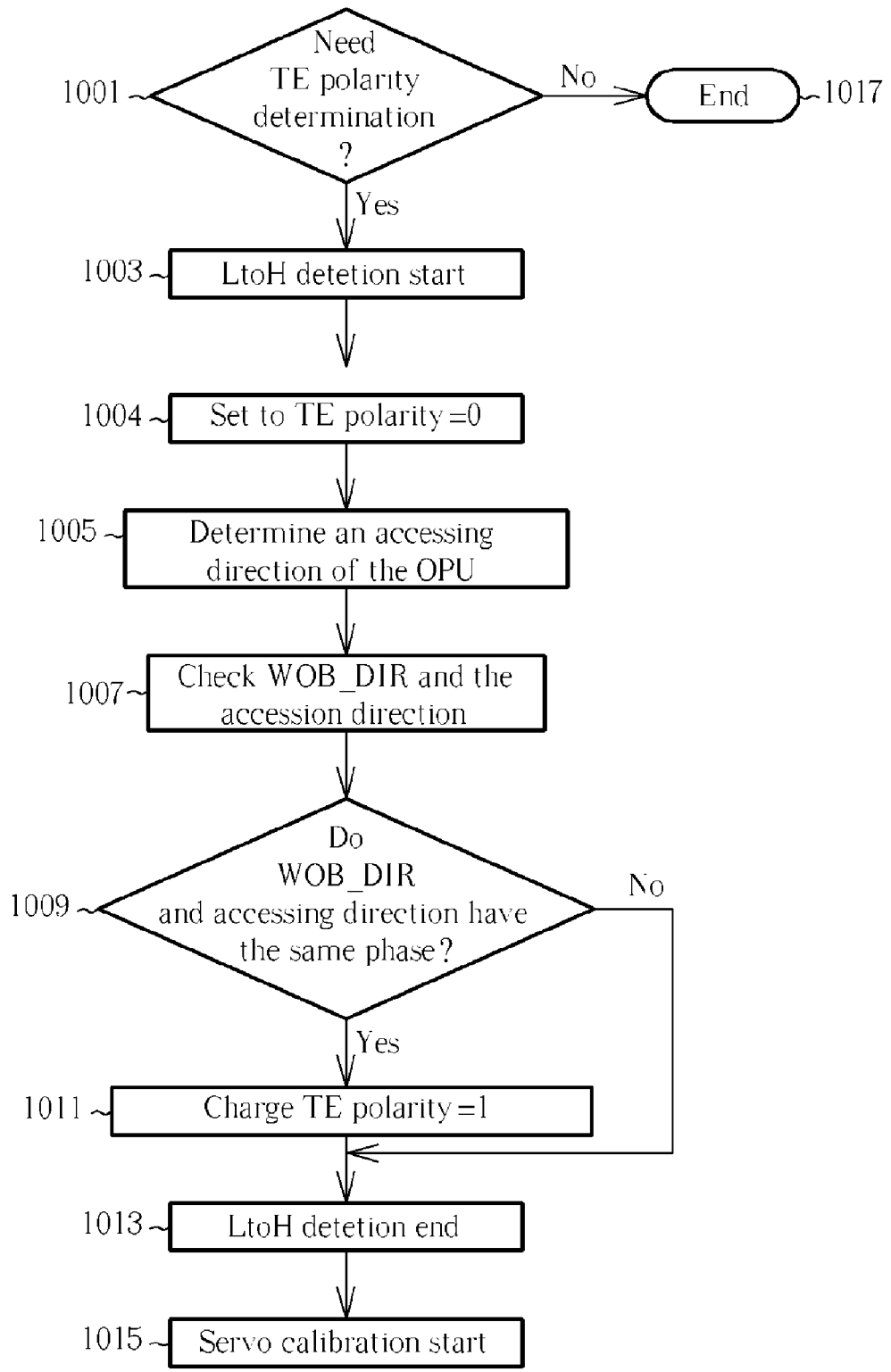
FIG. 10 is a flow chart illustrating the steps of a TE signal polarity determining method according to a third embodiment of the present invention.

The wobble dir signal can further be used for comparison with a accessing direction of an OPU for accessing an optical disc, as shown in FIG. 10. FIG. 10 is a flow chart illustrating the steps of the TE signal polarity determining method according to a third embodiment of the present invention. The method comprises:

Step 1001: Determine if the optical disc requires TE polarity determination. If yes, go to step 1003, if not, end the process.

Step 1003: Start L to H detection.

Step 1004: Set TE polarity=0.

Step 1005: Determine an accessing direction of the OPU, which is used for accessing an optical disc. In other words, the step 1005 is utilized for determining the accessing direction of the OPU.

Step 1007: Check wobble dir signal and the accessing direction.

Step 1009: Determine if the wobble dir signal and the accessing direction have the same phase, if yes, go to Step 1011, if no, go to Step 1013.

Step 1011: Change TE polarity=1.

Step 1013: L to H detection end.

Step 1015: Servo calibration start.

It should be noted that there are at least two cases for the step 1005, one is that the OPU lens does not move actually but moves relative to the tracks on the optical disc due to the rotation of the optical disc, and the other is that the OPU lens moves actually. In both cases, the OPU lens can move relative to the tracks of the optical disc outward or inward.

The wobble dir signal can be regarded as a wobble related signal, therefore the TE signal polarity determining method shown in FIG. 10 can be summarized as follows: a wobble related signal and a TE signal are obtained from an OPU accessing an optical disc; and it is determined if an original polarity of the TE signal from the optical disc should be changed according to the relation between the wobble related signal and the accessing direction of the OPU.

Figure 11:
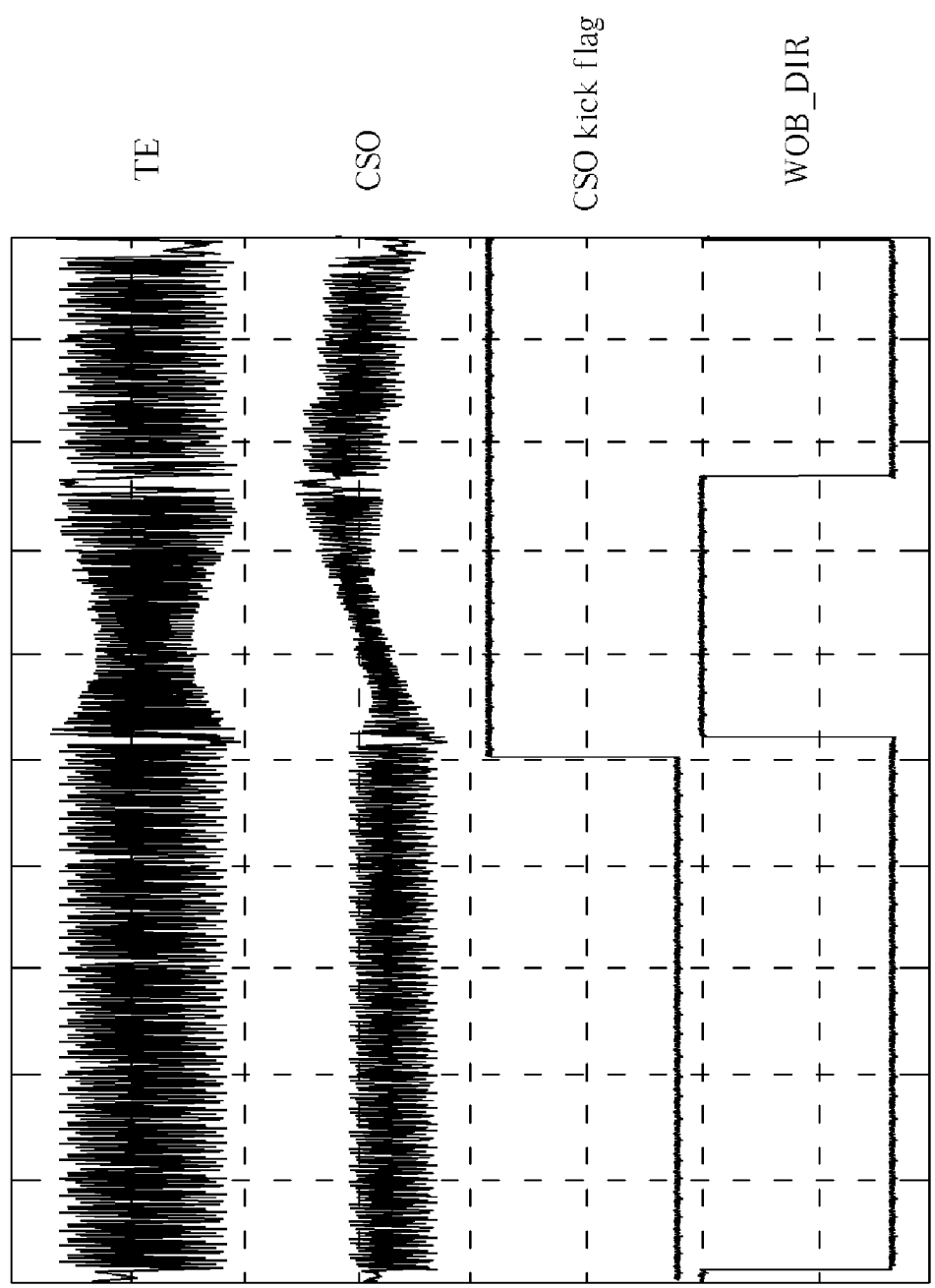
FIG. 11 to FIG. 12 are schematic diagrams illustrating the relations between signals utilized in the embodiment shown in FIG. 10.
Figure 12:
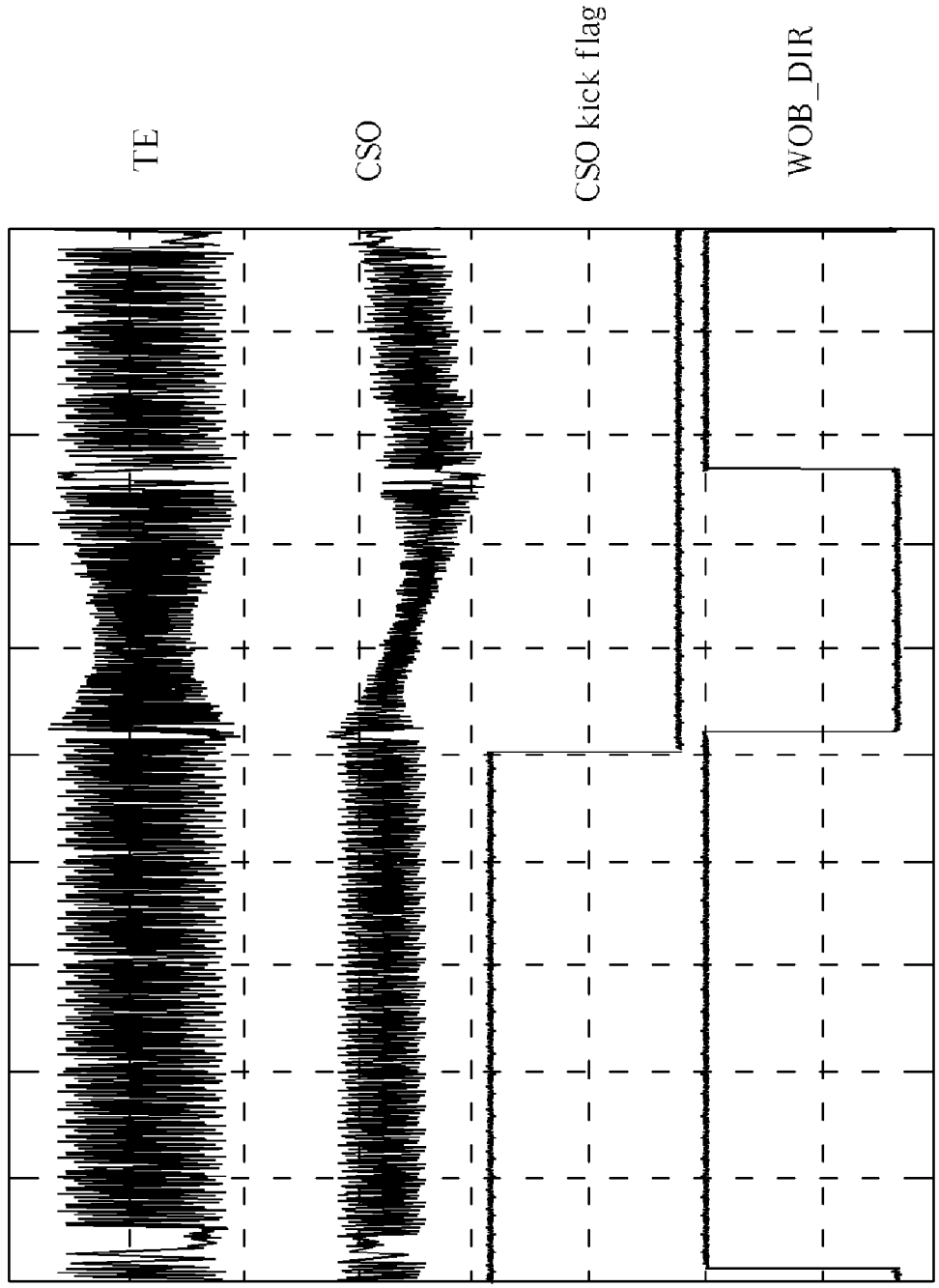

FIG. 11 to FIG. 12 are schematic diagrams illustrating the relations of signals utilized in the embodiment shown in FIG. 10. For both embodiments, the OPU lens actually moves. In these figures, TE indicates a TE signal, CSO indicates the accessing direction of the OPU, and CSO kick flag indicates a signal controls the accessing direction of the OPU. In FIG. 11, the optical disc is an in-groove disc, the OPU lens moves from an inner groove to an outer groove of the disc, and the CSO and wobble dir signal are in phase. Also, In FIG. 12, the optical disc is also an in-groove disc, the OPU lens moves from an outer groove to an inner groove of the disc, and the CSO and wobble dir signal are also in phase. If the optical disc is an on-groove optical disc, the CSO and wobble dir signal are anti phase.

Figure 13A:
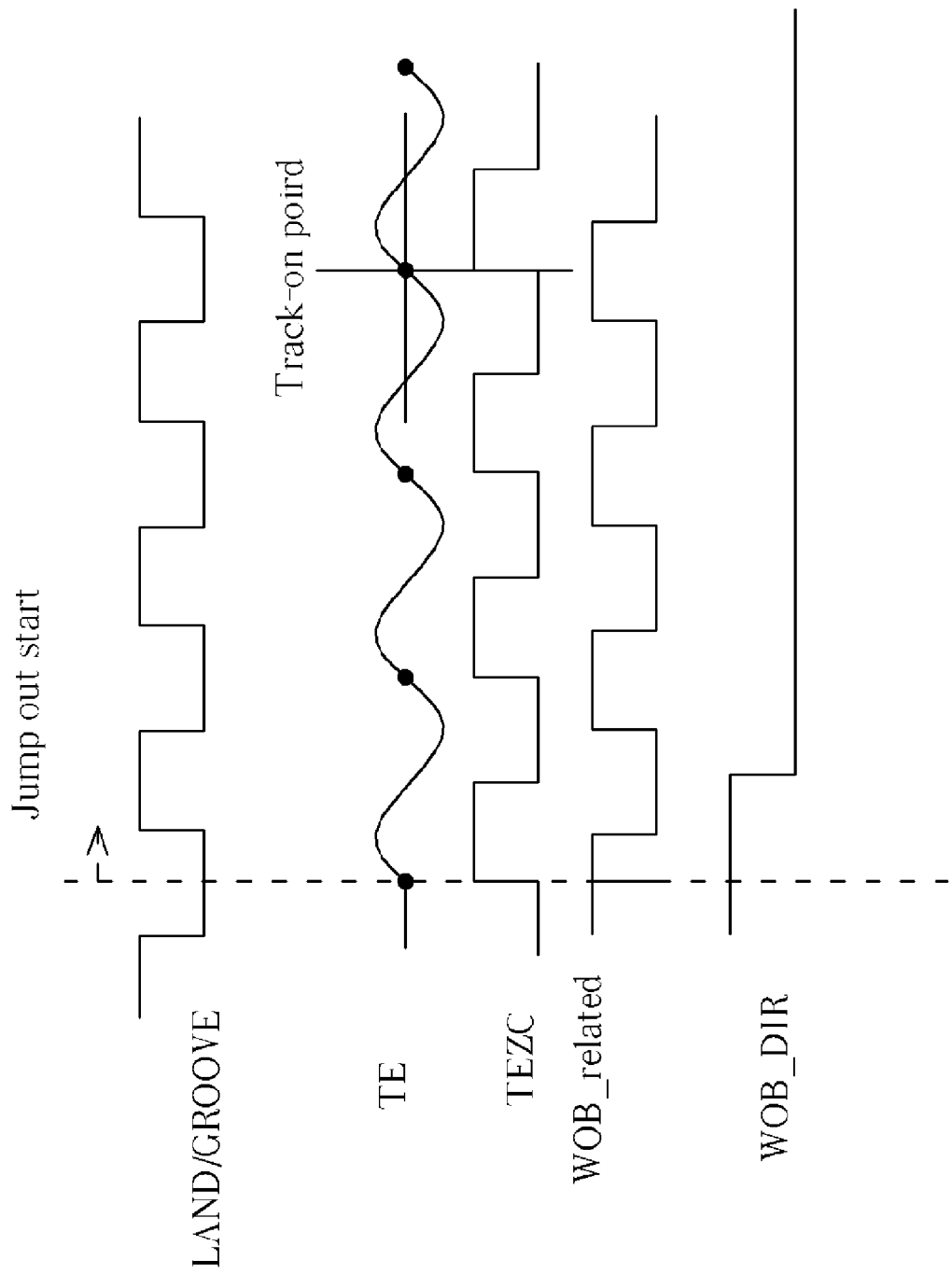
FIG. 13 (a) is a schematic diagram illustrating the operation of the wobble dir signal when the OPU lens moves for an on-groove optical disc.
Figure 13B:
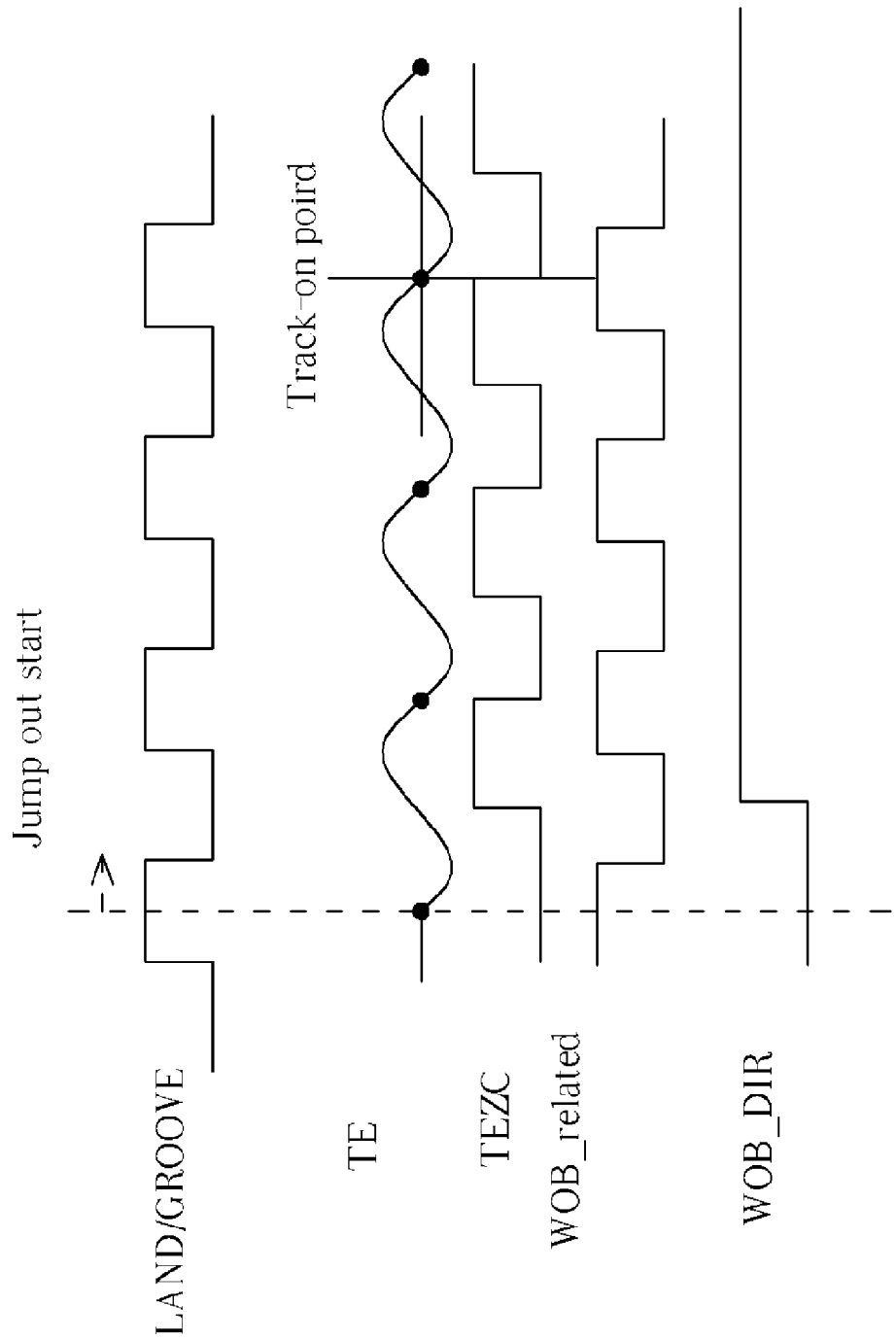

The reason why the TE polarity can be determined by observing the wobble dir and the accessing direction of the OPU can be understood more clearly by referring to FIG. 13 (*a*) and FIG. 13 (*b*). FIG. 13 (*a*) is a schematic diagram illustrating the operation of the wobble dir signal when the OPU lens moves for an on-groove optical disc. As shown in FIG. 13 (*a*), the data is recorded on a groove of an optical disc, therefore the TE signal is as shown in FIG. 13 (*a*). The TEZC is used for indicating the phase of the TE signal. When the OPU moves from an inner groove to an outer groove, the phase of the wobble related signal lags the phase of the TE signal, thus the level of the wobble dir signal changes from high to low.

FIG. 13 (*b*) is a schematic diagram illustrating the operation of the wobble dir signal when the OPU lens moves for an in-groove optical disc. The data is recorded on a land of an optical disc, therefore the TE signal is as shown in FIG. 13 (*b*). When the OPU lens moves from an inner groove to an outer groove, the phase of the wobble related signal leads the phase of the TE signal, thus the level of the wobble dir signal changes from low to high.

Figure 14:
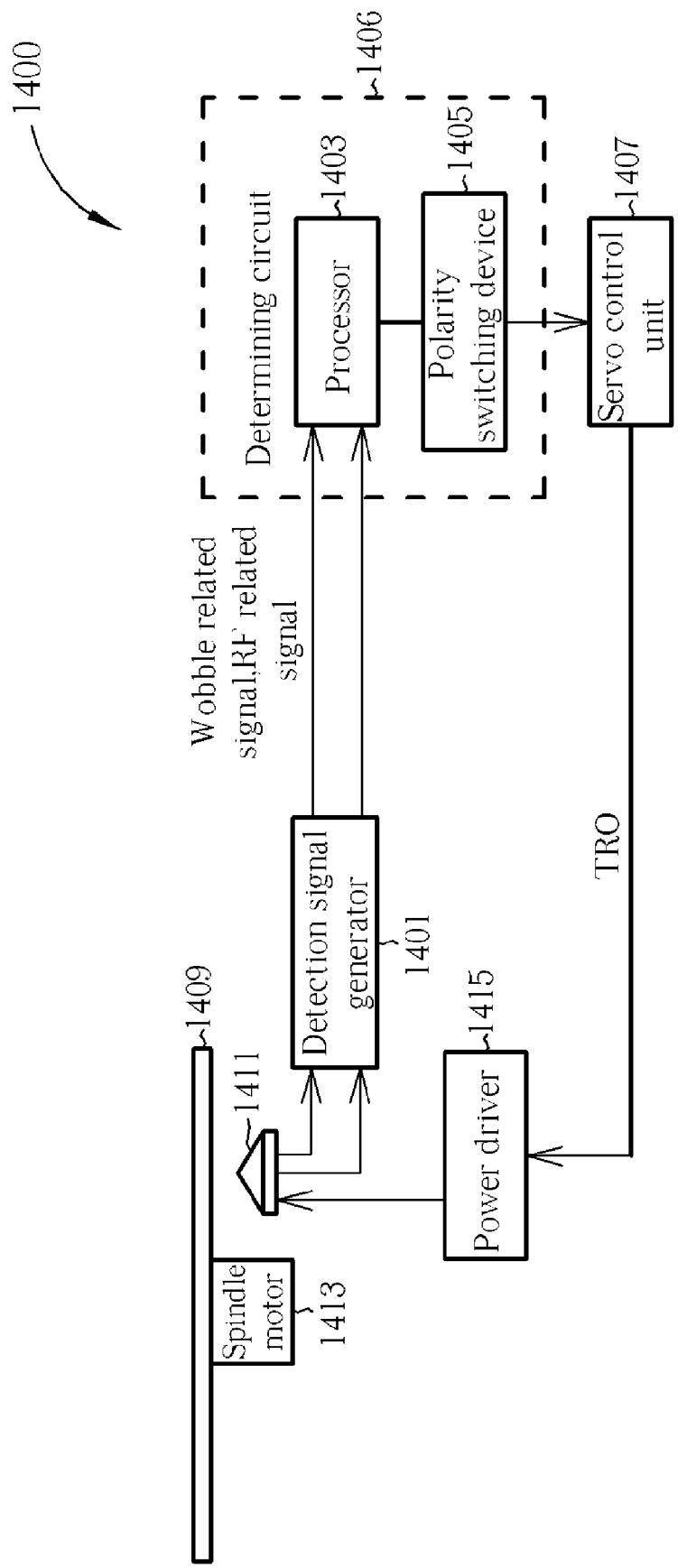
FIG. 14 is a block diagram illustrating a TE polarity determination system utilized by the embodiments shown in FIG. 1, FIG. 4 and FIG. 9.

FIG. 14 is a block diagram illustrating a TE polarity determination system 1400 utilized by the embodiments shown in FIG. 1, FIG. 4 and FIG. 10. As shown in FIG. 14, the TE polarity determination system 1400 includes a detection signal generator 1401 and a determining circuit 1403.

For the embodiment shown in FIG. 1, the detection signal generator 1401 is used for detecting a detection signal from the signals reflected from the optical disc. The determining circuit 1406 is used for obtaining the characteristics of the detection signal DS corresponding to different polarities of the TE signal and for determining whether an original polarity of the TE signal should be changed or not according to the characteristics. The determining circuit 1406 can comprise a processor 1403 and a polarity switching device 1405. The processor 1403 is used for obtaining the characteristics of the detection signal corresponding to different polarities of the TE signal and for determining whether an original polarity of the TE signal should be changed or not according to the characteristics.

The polarity switching device 1405 is used for changing the polarity of the TE signal. The polarity switching device 1405 can be integrated with the processor 1403. The detailed operation of the system 1400 can be obtained from the description shown in FIG. 1 to FIG. 3, and thus is omitted here for brevity. The OPU 1411 is used for accessing the optical disc 1409, the spindle driver 1413 is used for rotating the optical disc 1409, and the servo control unit is used for performing servo calibration to control the power driver 1415. These operations are well known by persons skilled in the art, and thus are omitted for brevity.

If the TE polarity determination system 1400 is utilized for the second embodiment shown in FIG. 4, the detection signal generator 1401 is used for obtaining a wobble related signal and an RF related signal from the signals reflected from the optical disc 1409. The determining circuit 1406 is used for determining if an original polarity of the TE signal should be changed or not according to phases of the RF related signal and the wobble related signal.

In this embodiment, the detection signal generator 1401 can further obtain a TE signal from an optical disc 1409 and generate the wobble dir signal and the RF dir signal. The determining circuit 1406 determines if an original polarity of the TE signal should be changed or not according to the wobble dir signal and the RF dir signal. Other detailed characteristics can be obtained from the description shown in FIG. 4~FIG. 10, and thus the details are omitted here for brevity.

Similarly, the determining circuit 1406 utilized for the embodiment shown in FIG. 4 can comprise a processor 1403 and a polarity switching device 1405. The processor 1403 is used for checking if the phases of the wobble dir signal and the RF dir signal are the same for an original polarity of the TE signal. The polarity switching device 1405 is used for keeping the original polarity if the phases of the wobble dir signal and the RF dir signal are the same, and for switching the TE signal to another polarity if the phases of the wobble dir signal and the RF dir signal are different. Also, the polarity switching device 1405 can be integrated with the processor 1403.

If the TE polarity determination system 1400 is utilized for the third embodiment shown in FIG. 10, the detection signal generator 1401 is used for obtaining a wobble related signal and a TE signal from the optical disc 1409. The determining circuit 1406 is used for determining if an original polarity of the TE signal from the optical disc 1409 should be changed or not according to the relation between the wobble related signal and a moving direction of the OPU 1411 (the accessing head).

The detection signal generator 1401 further generates a wobble dir signal according to the phases of the wobble related signal and the TE signal. The determining circuit 1406 determines if an original polarity of the TE signal from the optical disc should be changed or not according to the wobble dir signal and the moving direction of the OPU 1411.

The determining circuit 1406 can comprise a processor 1403 and a polarity switching device 1405. The processor 1403 is used for checking if the phases of the wobble dir signal and the moving direction of the OPU 1411 are the same for an original polarity of the TE signal. The polarity switching device 1405 is used for keeping the original polarity if the phases of the wobble dir signal and the RF dir signal are the same, and for switching the TE signal to another polarity if the phases of the wobble dir signal and the RF dir signal are different. The polarity switching device 1405 can also be integrated with the processor 1403, as mentioned above.

Those skilled in the art will readily observe that numerous modifications and alterations of the device and method may be made while retaining the teachings of the invention.

What is claimed is:

1. A tracking error (TE) signal polarity determining method for an optical disc drive to access an optical disc, comprising:
    (a) obtaining a detection signal;
    (b) obtaining characteristics of the detection signal respectively corresponding to different polarities of the TE signal; and
    (c) determining whether an original polarity of the TE signal should be changed or not according to the obtained characteristics.

2. The method of claim 1, wherein the detection signal is a wobble signal, and step (c) determines if the original polarity of the TE signal should be changed or not according to the ripple of the wobble signal.

3. The method of claim 1, wherein the detection signal is a wobble related signal.

4. The method of claim 3, wherein the wobble related signal is a wobble AGC (auto gain control) signal, and step (c) determines if the original polarity of the TE signal should be changed or not according to the amplitude of the wobble AGC signal.

5. The method of claim 1, wherein the detection signal is an RF related signal.

6. The method of claim 5, wherein the RF related signal is an RF AGC signal, and step (c) determines if the original polarity of the TE signal should be changed or not according to the amplitude of the RF AGC signal.

7. A tracking error (TE) signal polarity determining system for an optical disc drive to access an optical disc, comprising:
    a detection signal generator, coupled to an optical pickup unit (OPU), for generating a detection signal from the signals reflected from the optical disc; and
    a determining circuit, coupled to the detection signal generator, for obtaining the characteristics of the detection signal respectively corresponding to different polarities of the TE signal and for determining whether an original polarity of the TE signal should be changed or not according to the characteristics.

8. The system of claim 7, wherein the detection signal is a wobble signal, and the determination circuit determines if the original polarity of the TE signal should be changed or not according to the ripple of the wobble signal.

9. The system of claim 7, wherein the detection signal is a wobble related signal.

10. The system of claim 9, wherein the wobble related signal is a wobble AGC signal, and the determination circuit determines if the original polarity of the TE signal should be changed or not according to the amplitude of the wobble AGC signal.

11. The system of claim 7, wherein the detection signal is an RF related signal.

12. The system of claim 11, wherein the RF related signal is an RF AGC signal, and the determination circuit determines if the original polarity of the TE signal should be changed or not according to the amplitude of the RF AGC signal.

13. The system of claim 7, wherein the polarity switching device is integrated with the processor.

14. The system of claim 7, wherein the determining circuit comprises:
    a processor, coupled to the detection signal generator, for obtaining the characteristics of the detection signal corresponding to different polarities of the TE signal and for determining whether an original polarity of the TE signal should be changed or not according to the characteristics; and
    a polarity switching device, coupled to and controlled by the processor, for changing the polarity of the TE signal.

15. The system of claim 14, wherein the polarity switching device is integrated with the processor.

* * * * *